Aug. 17, 1965 W. C. ANDERSON ETAL 3,201,593

LOW POWER DRAIN PULSE FORMERS

Filed April 4, 1961

INVENTORS
WILMER C. ANDERSON
SANFORD J. DEMBY
BY [signature]
ATTY.

United States Patent Office 3,201,593

Patented Aug. 17, 1965

3,201,593

LOW POWER DRAIN PULSE FORMERS

Wilmer C. Anderson, Greenwich, Conn., and Sanford J. Demby, New York, N.Y., assignors to General Time Corporation, New York, N.Y., a corporation of Delaware Filed Apr. 4, 1961, Ser. No. 100,663
6 Claims. (Cl. 307—88)

This invention relates to saturable magnetic core pulse formers and more particularly to improvement in the type of pulse formers disclosed in United States Patent No. 2,897,380, issued July 28, 1959, on the application of Carl Neitzert.

Pulse formers as devices which produce an electrical pulse of a given voltage and duration in response to each input signal, may be of the saturable magnetic core type for many reasons, such as the stability, trouble-free operation, and long life associated with magnetic devices. Their compactness and low power drain make them especially useful in data processing and logic circuits generally for sizing signals representing information bits. Even so, the pulse formers, as the input circuits for the logic or data processing circuitry, very often draw very much more source power than all of the remaining equipment. In addition to the obvious economic disadvantage associated with high source power, the heat generated may cause the pulse former characteristics to drift.

Accordingly, it is an object of this invention to provide a saturable magnetic core pulse former requiring very low operating power.

It is a further object to provide pulse forming stages which draw no power except during the time when pulses are actually formed.

Another object of this invention is to reduce the heat that must be dissipated in a pulse former stage.

Figure 1:
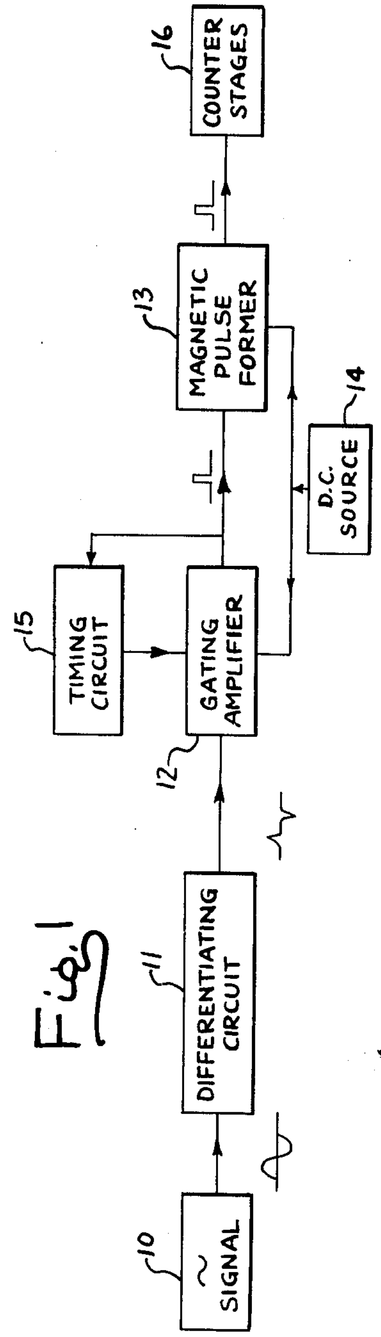
Figure 2:
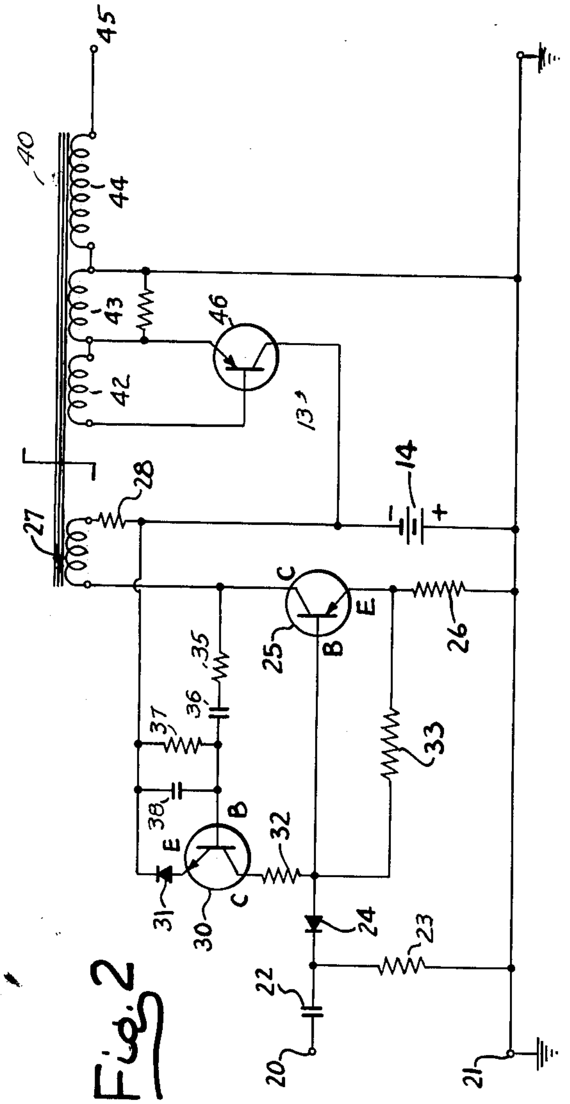

Other objects and advantages of the invention will be apparent from the following description taken with the accompanying drawing in which:

FIG. 1 is a block diagram of a system employing a pulse former in accordance with the invention; and FIG. 2 is a circuit diagram of the apparatus of FIG. 1.

While the invention is susceptible of various modifications and alternative constructions, there is shown in the drawing and will herein be described in detail a certain preferred embodiment. It is to be understood that it is not thereby intended to limit the invention to the particular form disclosed, but it is on the other hand intended to cover all modifications, equivalents and alternative constructions falling within the spirit and scope of the invention as expressed in the appended claims.

As shown in FIG. 1, a system employing a pulse former is shown in which an alternating signal source 10 is employed to initiate a train of pulses of the same frequency. This source may have a high impedance and need not present signals of constant amplitude since it merely triggers the pulse generating circuits. A differentiator 11 converts the signal to voltage spikes and those of the selected polarity turn on a normally non-conducting gating amplifier 12. The amplifier output is applied to a core winding of a magnetic pulse former 13 and necessarily for a sufficient time to magnetize the pulse former core. The abrupt cutoff of current from the amplifier and flux decay is then relied upon to initiate the pulse former core resetting and output pulse generating circuitry. Both the pulse former and amplifier are powered by a direct current source 14, and cutoff of the amplifier or gate very soon after saturation of the pulse former core is very desirable to reduce the drain on the source 14.

As further indicated in FIG. 1, the initiation of magnetizing current operates a timed switching circuit 15 which keeps the amplifier 12 on for a measured period beyond the duration of the amplifier input spike until after the pulse former core is saturated. The amplifier 12 is then turned off. The relative time periods involved are best illustrated by a practical example. Thus, a 60 cycle per second timing source 10, which itself has a half cycle duration over 8000 microseconds may be employed to trigger a pulse former generating 15 microsecond output pulses at a 60 cycle per second repetition rate. Assuming a core magnetizing time in the vicinity of the output pulse duration, the amplifier is kept on for a slightly longer period, such as, for example, 20 to 30 microseconds. This represents a tremendous power saving in terms of drain on the source 14 as compared with the drain when the amplifier is energized for the full half cycle period at the signal frequency. By thus preliminarily forming a slightly oversize pulse input to the magnetic pulse former, the more precisely-sized magnetic pulse former pulses are reliably formed at low power drain for use in a following train of counters 16 or other utilization circuits.

In accordance with the further aspects of the invention the controlled switch devices of the timing circuit 15 and gating amplifier 12 are energized only for a pulse period and draw no current whatever during the usually long period between pulses. As shown in FIG. 2, the switching devices are transistors and turn themselves completely off after functioning to form a pulse.

Turning now to the circuit structure shown in FIG. 2, an alternating voltage signal is applied between input terminal 20 and a ground bus or reference point 21 which is also the positive terminal of the direct current source 14. The differentiating circuit suitably is provided by a capacitor 22 from terminal 20 to a grounded resistor 23. Since only negative-going impulses are employed in this instance for turning on the gating amplifier 25, the amplifier control electrode is connected through a rectifier 24 to the junction of the differentiating capacitor 22 and resistor 23. The voltage spike is usually of very few microseconds duration but has a sufficiently high amplitude for reliable triggering.

The gating amplifier 25 is a junction transistor, polarized P-N-P in this instance, with its emitter, base, and collector electrodes E, B, and C connected in a base-input, common-emitter circuit. The input circuit to the base B from the differentiator is completed by returning the emitter E to ground through a gate bias resistor 26. The output circuit comprises, in series connection from the collector C, the core magnetizing or saturating coil winding 27 of the magnetic pulse former 13, a series resistor 28 and the direct current source 14. In this instance, the source 14 is represented as a battery, its negative terminal being connected to the resistor 28 and its positive terminal being grounded so that the output circuit is completed from ground to the emitter E through the resistor 26 common to both input and output circuits. Such an amplifier 25 will be recognized as normally non-conductive and is turned on when its base B is rendered negative with respect to the emitter E by a negative voltage spike from the differentiator. At such times, current flows through the transistor between the collector C and emitter E terminals as through a closed switch and the magnetizing voltage is applied across the pulse former winding 27.

To keep the gating amplifier 25 turned on after the input triggering spike has decayed, the timed switching circuit 15 employs a second junction transistor 30, polarized N–P–N in this instance, also connected in a base-input, common emitter configuration. With its emitter E returned directly to the negative terminal of source 14 through a rectifier 31, most of the output circuit voltage drop is divided between a series of three voltage-dividing resistors between the collector C and the positive ground. As shown in FIG. 2, this voltage divider consists of resistor 32 between the collector C of timing transistor 30 and the base B of the gating transistor 25; resistor 33 between base B of the gating transistor 25 and its emitter E; and the gate bias resistor 26. When the timing transistor 30 is rendered conductive by an input circuit control voltage, output current flows from the positive terminal of the battery 14 through the voltage divider, and through the timing transistor collector C and emitter E, back to the negative battery terminal. The base B of the gating transistor 25 is kept at a negative potential with respect to its emitter by the voltage drop across the divider resistor 33, and the condition for maintaining the gate transistor conductive is maintained.

Control of the conduction state of the timing transistor 30 is provided by its input circuit which is energized from the output circuit of the gating transistor 25. As shown in FIG. 2, a first timing resistor 35, a first timing capacitor 36, and a second timing resistor 37 are connected in series between the collector C of the gating transistor 25 and the negative battery terminal. This places the series combination in parallel with the gating transistor output circuit resistance represented by pulse former winding 27 and resistor 28. When the amplifier 25 is turned on, charging current flows into the capacitor 36 and the charging voltage is generated across resistors 35 and 37. The junction of the capacitor 36 and resistor 37 is connected to the base B of the timing transistor 30, thus placing the base at a positive potential relative to the timing transistor emitter by reason of the voltage existing across resistor 37. A second timing capacitor 38 shunts resistor 37 and helps establish the timing transistor base potential. Under these conditions, the N–P–N timing transistor 30 is rendered conductive and in turn biases the input circuit of the gating amplifier 25 to maintain it in a conducting state as previously described.

The relative values of the timing capacitors and resistors are adjusted or selected to turn off the timing transistor 30 after the gating amplifier 25 has been on for a sufficient length of time to drive the core of the pulse former into saturation. Capacitor 38 is preferably of smaller value than capacitor 36 and is charged while charging current to capacitor 36 flows through resistor 37. After capacitor 36 is fully charged, the base B of transistor 30 remains positive until capacitor 38 discharges through resistor 37. As the base voltage on the timing transistor 30 drops, conduction through the timing transistor 30, and in turn through the gating transistor 25, is cutoff. The conduction current cutoff rate increases as current decreases since capacitor 36 also discharges and drives the base B of transistor 30 more negative. Both of the transistors thus rapidly become non-conducting, and both remain non-conducting until the next voltage spike is applied to the base of the gate 25. Maintenance of complementary conduction states of the two transistors is not required.

The time constants of the resistance-capacitance combinations of the timing transistor input circuit determine the time duration of current flow through the gating amplifier 25 independently of the duration of the input signal. In a practical embodiment in which transistors 25 and 30 were types 2N520A and 2N445 respectively, the values were:

| | | |
|---|---|---|
| Capacitor 36 | microfarads | .005 |
| Capacitor 38 | do | .001 |
| Resistor 35 | ohms | 1500 |
| Resistor 37 | do | 1000 |

A saturable core pulse former 13 driven by the gating amplifier pulses is also shown in FIG. 2. Its core 40 is preferably a spirally wound annulus of a tape made of nickel-iron alloy or other highly retentive, substantially rectangular hysteresis loop magnetic material. In addition to the input saturating or magnetizing core winding 27 previously referred to are the control winding turns 42 which trigger the resetting of the core, the reset winding turns 43 which drive the core to saturation in the reverse or resetting direction, and output winding turns 44 which provide an exactly sized output pulse between terminal 45 and ground in response to the predetermined core flux change during reset.

In the pulse former a transistor 46 operates as a blocking oscillator to switch the battery 14 across the resetting turns in response to the triggering voltage induced by the decay of the input on magnetizing flux at the end of the input pulse. The pulse former structure and operation is described in detail in the referenced Neitzert Patent No. 2,897,380. For the purposes of further describing an embodiment of the present invention, it is sufficient to note that when the core 40 is driven beyond the loop saturation level, i.e., beyond the sharp knee of the magnetization curve, the resulting flux increment decays when the magnetizing voltage is removed. The resulting induced voltage triggers the reset action, but must await the end of the magnetizing voltage pulse. Thus the magnetizing voltage through winding 43 must necessarily remain applied for a short period after the core 40 has been driven to the loop saturation level, but battery power is wasted if the voltage is applied for a long period after saturation. The relatively sharp cutoff of the pulse from the gating amplifier 25 also results in a greater induced trigger voltage than if the magnetizing voltage slowly decreases, thus assuring reliability of operation for the modest battery power drain required.

It will be appreciated that various low power input signal sources may be employed in the apparatus of FIG. 2, and likewise that the apparatus may be employed with various forms of load devices.

We claim as our invention:

1. In a saturable core pulse former having a core magnetizing winding and a direct current power source, first and second normally open electronic switching devices each having a control electrode, means for connecting the control electrode of the first device to a source of triggering impulses for closing the first device for the duration of each impulse, said first switching device being connected in circuit with said magnetizing winding and said power source, said second switching device coupling said power source with the control electrode of said first device to maintain said first switching device closed when the second switching device is closed, said first switching device also coupling said power source to the control electrode of the second switching device to close the second switching device when the first switching device closes, and time delay means for uncoupling the input electrode of the second device a given interval after the first switching device is closed to successively open the second and first switching devices and terminate the magnetizing winding current.

2. In a pulse former having a pulse circuit powered by a direct current power source, first and second normally open switching devices each having a control means, means for connecting the control means of the first device to a source of triggering impulses for closing the first switching device for the duration of each impulse, said first switching device being connected in series with said direct current source, said second switch coupling said power source with the control means of said first device to maintain said first switching device closed when the second switching device is closed, said first switch also coupling said direct current power source to the control means of the second switching device to close the second switch, and time delay means for uncoupling the input electrode of the second device a given interval after the first switch is closed to successively open both the second and first switching devices and thus open the pulse circuit.

3. In a low power drain saturable core pulse former having a core magnetizing winding and a direct current power source, first and second normally non-conducting switching transistors each having an output circuit including said power source and a control circuit, means for cross coupling the output circuit of each transistor to the control circuit of the other to maintain either transistor conductive when the other is conductive, means for supplying a train of triggering impulses to the control circuit of the first transistor to render it conductive, the output circuit of the first transistor including said magnetizing winding, and time delay means in the input circuit of the second transistor energizable by the initiation of conduction in the output circuit of the first transistor connected to render the second transistor non-conductive after a given interval whereby both transistors are rendered non-conductive until receipt of a further triggering impulse.

4. An apparatus for forming electrical pulses comprising a saturable reactor having a rectangular hysteresis loop core and a saturation winding, means including first and second normally non-conductive electronic devices, said first device being connected in circuit with said winding and a direct current source for controlling the duration of current flow through said saturation winding, means responsive to the receipt of a trigger pulse for rendering the first devices conductive, means responsive to conduction in said first device for rendering the second device conductive, means in turn responsive to conduction in said second device for maintaining said first device conductive beyond the duration of a trigger pulse, and a capacitive-resistive network in the input circuit of said second device for rendering it non-conductive for a given time interval after the first device is rendered conductive whereby both transistors are rendered non-conductive until receipt of another trigger pulse.

5. In a low power drain saturable core pulse former having a core magnetizing winding and a direct current power source, first and second normally non-conducting switching transistors each having an output circuit including said power source and a control circuit, means for cross coupling the output circuit of each transistor to the control circuit of the other to maintain either transistor conductive when the other is conductive, means for supplying a triggering impulse to the control circuit of the first transistor to render it conductive, the output circuit of the first transistor including said magnetizing winding, and a resistance-capacitance network in the input circuit of said second transistor for rendering the second transistor non-conductive a given interval after the trigger impulse whereby both transistors are rendered non-conductive until receipt of a further triggering impulse.

6. A pulse former having a direct current power source and switching means for connecting the power source across load terminals for predetermined pulse durations, said switching means comprising first and second switching transistors each having a control electrode and normally open output circuit including said direct current source, means for supplying a trigger impulse to the first transistor control electrode to initiate a first transistor output circuit pulse, means also coupling the first transistor control electrode to the second transistor output circuit to maintain the first output circuit conducting whenever the second output circuit is conducting, and a resistive-capacitive time delay network coupling the first transistor output circuit to the second transistor control electrode to render the second transistor output circuit conductive only for a given time interval after the first output circuit is conductive whereby both transistors are thereafter again non-conductive until another trigger impulse is supplied.

References Cited by the Examiner

UNITED STATES PATENTS

| | | | |
|---|---|---|---|
| 2,858,379 | 10/58 | Stanley | 330—20 |
| 2,897,380 | 7/59 | Neitzert | 340—174 |
| 2,997,606 | 8/61 | Hamburger et al. | 307—88.5—3 |
| 3,035,184 | 5/62 | Walker et al. | 307—88.5 |
| 3,089,036 | 5/36 | Sommerfield. | |

IRVING L. SRAGOW, *Primary Examiner.*

BERNARD KONICK, JOHN T. BURNS, *Examiners.*